US008718402B2

(12) United States Patent
Liu et al.

(10) Patent No.: US 8,718,402 B2
(45) Date of Patent: *May 6, 2014

(54) DEPTH GENERATION METHOD AND APPARATUS USING THE SAME

(75) Inventors: Guang-zhi Liu, Shanghai (CN); Chun Wang, Shanghai (CN); Jian-de Jiang, Shaanxi Province (CN); Xing-Rui Wang, Shanghai (CN); Yong Wu, Shanghai (CN)

(73) Assignee: Novatek Microelectronics Corp., Hsinchu (TW)

( * ) Notice: Subject to any disclaimer, the term of this patent is extended or adjusted under 35 U.S.C. 154(b) by 190 days.

This patent is subject to a terminal disclaimer.

(21) Appl. No.: 13/298,309

(22) Filed: Nov. 17, 2011

(65) Prior Publication Data

US 2013/0069935 A1    Mar. 21, 2013

(30) Foreign Application Priority Data

Sep. 16, 2011    (CN) .......................... 2011 1 0274347

(51) Int. Cl.
*G06K 9/36* (2006.01)
*G06T 15/00* (2011.01)

(52) U.S. Cl.
USPC .......................................... 382/285; 345/419

(58) Field of Classification Search
USPC .......... 382/173, 276, 285, 312; 345/419, 422, 345/653, 654; 348/43, 155, 208.4
See application file for complete search history.

(56) References Cited

U.S. PATENT DOCUMENTS

| 7,227,896 | B2* | 6/2007 | Sun ........................... 375/240.16 |
| 8,059,157 | B2* | 11/2011 | Kuo et al. .................. 348/208.6 |
| 8,488,869 | B2* | 7/2013 | Limonov ....................... 382/154 |
| 2010/0134640 | A1 | 6/2010 | Kuo et al. |
| 2012/0127267 | A1* | 5/2012 | Zhang et al. .................... 348/43 |

OTHER PUBLICATIONS

Kim et al., "A Stereoscopic Video Generation Method Using Stereoscopic Display Characterization and Motion Analysis," IEEE Transactions on Broadcasting, Jun. 2008, pp. 188-197.
"Office Action of Taiwan Counterpart Application", issued on Feb. 17, 2014, p. 1-p. 4.

* cited by examiner

*Primary Examiner* — Kanjibhai Patel
(74) *Attorney, Agent, or Firm* — Jianq Chyun IP Office

(57) ABSTRACT

A depth generation method adapted for a 2D to 3D image conversion device is provided. The depth generation method includes the following steps. Motion vectors in an image frame are obtained by motion estimation. A global motion vector of the image frame is obtained. Motion differences between the motion vectors of each block and the global motion vector are calculated. A depth-from-motions of each block is obtained based on the motion differences. Furthermore, a depth generation apparatus using the same is also provided.

20 Claims, 4 Drawing Sheets

DEPTH GENERATION METHOD AND APPARATUS USING THE SAME

CROSS-REFERENCE TO RELATED APPLICATION

This application claims the priority benefit of China application serial no. 201110274347.1, filed on Sep. 16, 2011. The entirety of the above-mentioned patent application is hereby incorporated by reference herein and made a part of this specification.

BACKGROUND OF THE INVENTION

1. Field of the Invention

The invention relates to an image processing method and an apparatus using the same. Particularly, the invention relates to a depth generation method for an image frame and an apparatus using the same.

2. Description of Related Art

With development of display technology, displays capable of displaying three-dimensional (3D) images are widely used. Image information required by the 3D display includes 2D images frame and depth information thereof. Based on the 2D image frames and the depth information thereof, the 3D display can reconstruct a corresponding 3D image frame. Therefore, how to obtain the depth information of the 2D image frames becomes an important issue to be studied.

Generally, the depth information of the image frame can be obtained by calculating variations of motion objects in the image frame. In the conventional technique, if a panning scene is captured by only swaying a lens, the depth information can be generated according to different times that different delayed frames enter human eyes. In other cases, motion objects in the image frame are grouped into a plurality of types, and then the depth information is generated according to different times that different delayed frames enter human eyes. Besides, a motion momentum of a motion object can also be directly mapped to the depth information.

However, in the aforementioned methods, many problems are encountered to lead to error depth information. For example, when foreground is static while background is moving (FSBM), the conventional technique may have a problem of reverse depth, i.e. an actual image with a large depth value conversely corresponds to a small generated depth value. Moreover, regarding the depth information generated according to the delayed frame principle, if a delayed period thereof is relatively long, a burden of a memory is excessively increased.

SUMMARY OF THE INVENTION

The invention is directed to a depth generation method and an apparatus using the same, by which depth information of an image frame can be effectively generated.

In one aspect, a depth generation method is provided, which is adapted to a two-dimensional (2D) to three-dimensional (3D) image conversion device. The depth generation method includes the following steps. Local motion vectors in an image frame are obtained by motion estimation. A global motion vector of the image frame is obtained. Motion differences between the local motion vectors and the global motion vector are calculated. A depth-from-motion of each of the blocks is obtained according to the motion differences.

In an embodiment of the invention, the image frame includes a black rim, a peripheral display region and a central display region. The step of obtaining the global motion vector of the image frame includes calculating the global motion vector according to a plurality of local motion vectors of the peripheral display region.

In an embodiment of the invention, the central display region covers a center of the image frame.

In an embodiment of the invention, the peripheral display region is located between the black rim and the central display region.

In an embodiment of the invention, the peripheral display region includes a plurality of sub regions. The step of obtaining the global motion vector of the image frame includes following steps. A statistic number distribution of the local motion vectors in each of the sub regions is calculated. A local motion vector having a maximum total number in each of the sub regions is obtained according to the statistic number distribution of each of the sub regions. The global motion vector of the image frame is determined according to the maximum total number of each of the sub regions and the corresponding local motion vector.

In an embodiment of the invention, at least two of the sub regions are overlapped to each other.

In an embodiment of the invention, the step of determining the global motion vector of the image frame according to the maximum total number of each of the sub regions and the corresponding local motion vector includes following steps. An intra-region global motion belief of each of the sub regions is determined according to the maximum total number of each of the sub regions. An inter-region global motion belief between each two of the sub regions is determined according to the local motion vector corresponding to the maximum total number of each of the sub regions, the global motion vector of the image frame is determined according to the intra-region global motion beliefs and the inter-region global motion beliefs.

In an embodiment of the invention, the step of obtaining the global motion vector of the image frame includes following steps. A global motion belief of each of the sub regions is calculated according to the intra-region global motion beliefs and the inter-region global motion beliefs. The global motion vector of the image frame is determined according to a maximum one of the global motion beliefs of the sub regions.

In an embodiment of the invention, the global motion belief of one of the sub regions is calculated according to the intra-region global motion belief of the one of the sub regions, the inter-region global motion beliefs between the one of the sub regions and the other sub regions, and the intra-region global motion beliefs of the other sub regions.

In an embodiment of the invention, the step of determining the inter-region global motion belief between each two of the sub regions includes following steps. Vector differences between the local motion vectors corresponding to the maximum total numbers of the sub regions are calculated. The inter-region global motion belief between each two of the sub regions is determined according to a corresponding one of the vector differences between the local motion vectors corresponding to the maximum total numbers of the sub regions.

In another aspect, a depth generation apparatus is provided, which is adapted to a two-dimensional (2D) to three-dimensional (3D) image conversion device. The depth generation apparatus includes a motion vector calculation module, a difference calculation module and a depth calculation module. The motion vector calculation module obtains local motion vectors in an image frame by motion estimation, and obtains a global motion vector of the image frame. The difference calculation module calculates motion differences between the local motion vectors and the global motion vector. The depth calculation module obtains a depth-from-motion of each of the blocks according to the motion differences.

In an embodiment of the invention, the image frame includes a black rim, a peripheral display region and a central display region. The motion vector calculation module calculates the global motion vector according to a plurality of local motion vectors of the peripheral display region.

In an embodiment of the invention, the central display region covers a center of the image frame.

In an embodiment of the invention, the peripheral display region is located between the black rim and the central display region.

In an embodiment of the invention, the peripheral display region includes a plurality of sub regions. The motion vector calculation module calculates a statistic number distribution of the local motion vectors in each of the sub regions, and obtains a maximum total number of each of the sub regions. The motion vector calculation module obtains a local motion vector having the maximum total number in each of the sub regions according to the statistic number distribution of each of the sub regions, and determines the global motion vector of the image frame according to the maximum total number of each of the sub regions and the corresponding local motion vector.

In an embodiment of the invention, at least two of the sub regions are overlapped to each other.

In an embodiment of the invention, the motion vector calculation module determines an intra-region global motion belief of each of the sub regions according to the maximum total number of each of the sub regions, determines an inter-region global motion belief between each two of the sub regions according to the local motion vector corresponding to the maximum total number of each of the sub regions, and determines the global motion vector of the image frame according to the intra-region global motion beliefs and the inter-region global motion beliefs.

In an embodiment of the invention, the motion vector calculation module calculates a global motion belief of each of the sub regions according to the intra-region global motion beliefs and the inter-region global motion beliefs, and determines the global motion vector of the image frame according to a maximum one of the global motion beliefs of the sub regions.

In an embodiment of the invention, the global motion belief of one of the sub regions is calculated according to the intra-region global motion belief of the one of the sub regions, the inter-region global motion beliefs between the one of the sub regions and the other sub regions, and the intra-region global motion beliefs of the other sub regions.

In an embodiment of the invention, the motion vector calculation module calculates vector differences between the local motion vectors corresponding to the maximum total numbers of the sub regions, and determines the inter-region global motion belief between each two of the sub regions according to a corresponding one of the vector differences between the local motion vectors corresponding to the maximum total numbers of the sub regions.

According to the above description, the depth generation method of the embodiments obtains the depth-from-motion of each block according to the motion differences between the local motion vectors and the global motion vector, so as to effectively generate the depth information of the image frame. Moreover, the global motion vector can be calculated according to the local motion vectors of the peripheral display region while neglecting the local motion vectors of the central display region, so that influence caused by foreground object motion can be excluded, and the correct global motion vector can be obtained, and accordingly accuracy of the depth-from-motion can be enhanced.

In order to make the aforementioned and other features and advantages of the invention comprehensible, several exemplary embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION OF DISCLOSED EMBODIMENTS

Generally, besides motion of an object, motion information of an image frame further includes a background motion caused by movement of a lens to capture the image, and the background motion can be, for example, measured by a global motion vector.

In an exemplary embodiment of the invention, a depth generation method calculates local motion vectors by motion estimation based on blocks or pixels. Moreover, the depth generation method further calculates a global motion vector of an image frame, so as to calculate differences between the local motion vectors and the global motion vector. Accordingly, depth-from-motions are generated according to the differences between the local motion vectors and the global motion vector. Moreover, in a process of calculating the global motion vector, since the local motion vectors in a central display region are neglected, an influence caused by foreground object motion can be excluded, and the correct global motion vector can be obtained, and accordingly accuracy of the depth-from-motion can be enhanced. In order to better convey the spirit of the invention, at least one exemplary embodiment is provided below with reference of figures for description.

Figure 1:
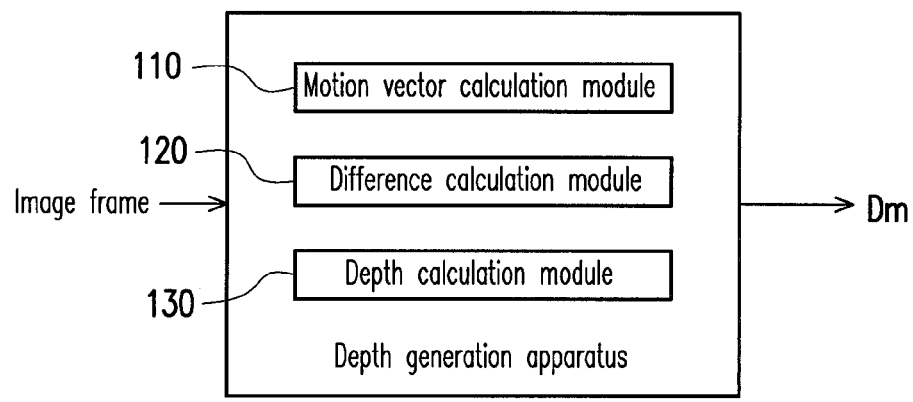
FIG. 1 is a block schematic diagram of a depth generation apparatus according to an embodiment of the invention.

FIG. 1 is a block schematic diagram of a depth generation apparatus according to an embodiment of the invention. The depth generation apparatus 100 of the present embodiment is used for executing a depth generation method, and is adapted to a two-dimensional (2D) to three-dimensional (3D) image conversion device. The image conversion device is, for example, applied in a 3D display for reconstructing a corresponding 3D image frame according to a 2D image frame and depth information thereof.

In the present embodiment, the depth generation apparatus 100 includes a motion vector calculation module 110, a difference calculation module 120 and a depth calculation module 130. The motion vector calculation module 110 obtains a plurality of local motion vectors in an image frame by motion estimation based on blocks or pixels, and obtains a global motion vector of the image frame. After the local motion vectors and the global motion vector are obtained, the difference calculation module 120 calculates motion differences between the local motion vectors and the global motion vector. Then, the depth calculation module 130 obtains a depth-from-motion Dm of each of the blocks or pixels according to the motion differences.

Figure 2:
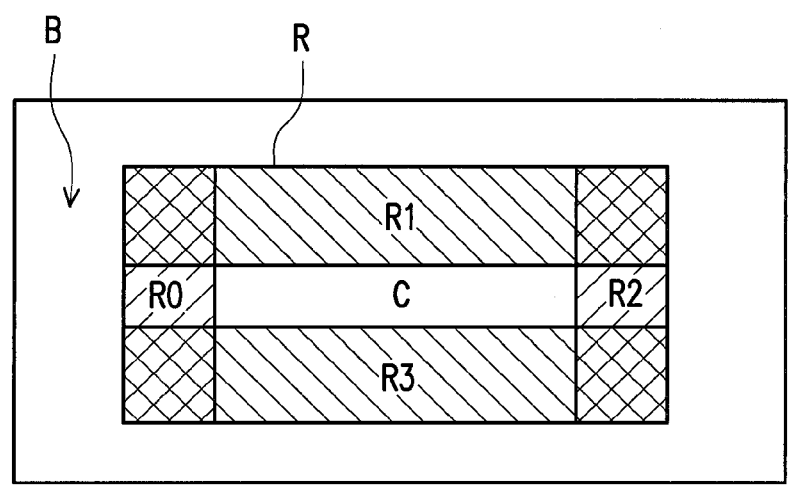
FIG. 2 is a schematic diagram illustrating an image frame received by the depth generation apparatus of FIG. 1.

FIG. 2 is a schematic diagram illustrating an image frame received by the depth generation apparatus 100 of FIG. 1. As shown in FIG. 2, the image frame received by the depth generation apparatus 100 includes a black rim B, a peripheral display region R and a central display region C. The central display region C preferably covers a center of the image frame. The peripheral display region R is located between the black rim B and the central display region C.

Generally, a foreground object is liable to appear at the central display region C of the image frame, and motion information of the foreground object may influence a detection of the motion vector calculation module 110 on the global motion vector. Therefore, to obtain a correct background motion without error, the motion vector calculation module 110 of the present embodiment calculates the global motion vector according to the local motion vectors of the peripheral display region R.

In the present embodiment, the peripheral display region R includes a plurality of sub regions R0, R1, R2 and R3. Therefore, regarding the local motion vectors used by the motion vector calculation module 110 in a process of calculating the global motion vector, the local motion vectors of the black rim B and the central display region C of the image frame are excluded, and only the local motion vectors of the sub regions R0, R1, R2 and R3 of the peripheral display region R are used. It should be noticed that allocation of the sub regions R0, R1, R2 and R3 of the peripheral display region R in FIG. 2 is only an example, and the invention is not limited thereto.

Figure 3:
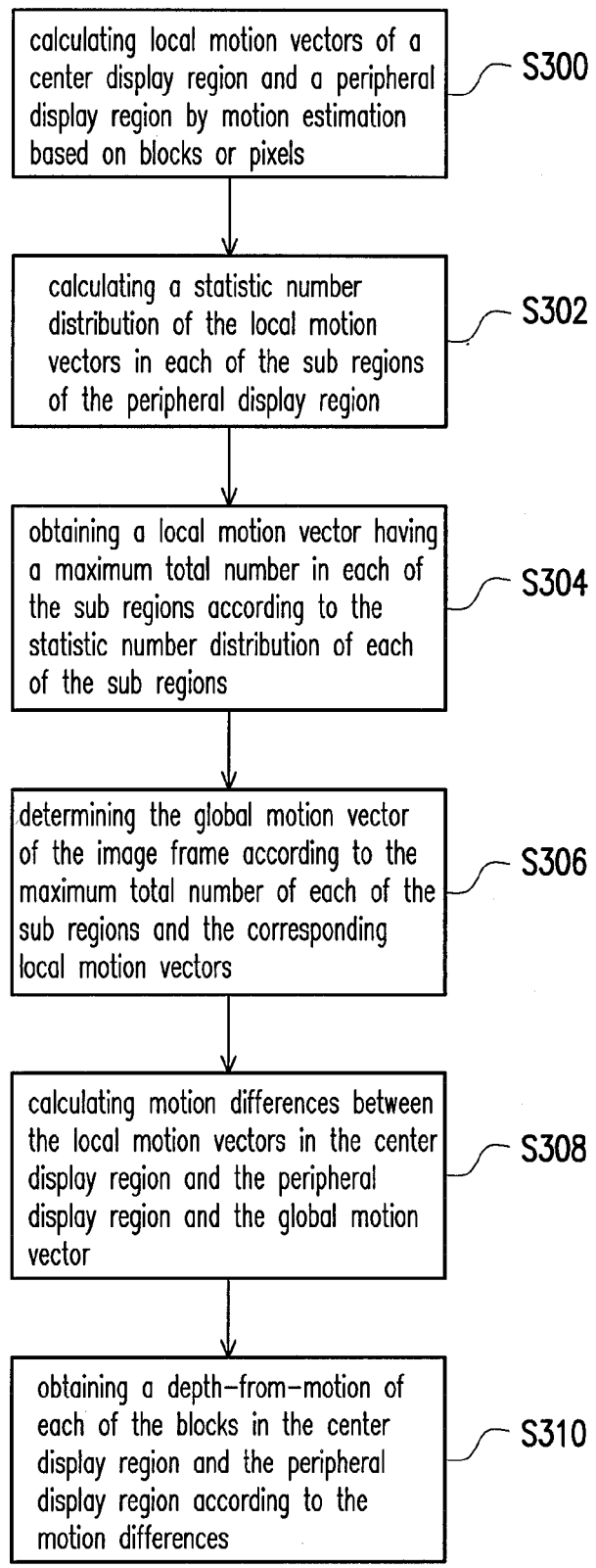
FIG. 3 is a flowchart illustrating a depth generation method according to an embodiment of the invention.

In detail, FIG. 3 is a flowchart illustrating a depth generation method according to an embodiment of the invention. Referring to FIG. 1 and FIG. 3, in step S300, the motion vector calculation module 110 calculates the local motion vectors of the central display region C and the peripheral display region R by motion estimation based on blocks or pixels. For example, the motion vector calculation module 110 performs frame rate conversion operations to obtain the local motion vectors.

Then, in step S302, the motion vector calculation module 110 calculates a statistic number distribution of the local motion vectors in each of the sub regions of the peripheral display region R, where a statistic method thereof is, for example, to use a histogram to represent the statistic number distribution of the local motion vectors. It should be noticed that in such step, the local motion vectors of the black rim B are not counted in calculation. Then, in step S304, the motion vector calculation module 110 obtains a local motion vector having a maximum total number in each of the sub regions according to the statistic number distribution of each of the sub regions. Then, in step S306, the motion vector calculation module 110 determines the global motion vector of the image frame according to the maximum total number of each of the sub regions and the corresponding local motion vectors.

Then, in step S308, the difference calculation module 120 calculates motion differences between the local motion vectors in the central display region C and the peripheral display region R and the global motion vector.

Then, in step S310, the depth calculation module 130 obtains a depth-from-motion of each of the blocks in the central display region C and the peripheral display region R according to the motion differences. A method for the depth calculation module 130 obtaining the depth-from-motions can include using a look-up table or a curve mapping relationship to generate the depth-from-motion of each of the blocks, though the invention is not limited thereto.

Figure 4:
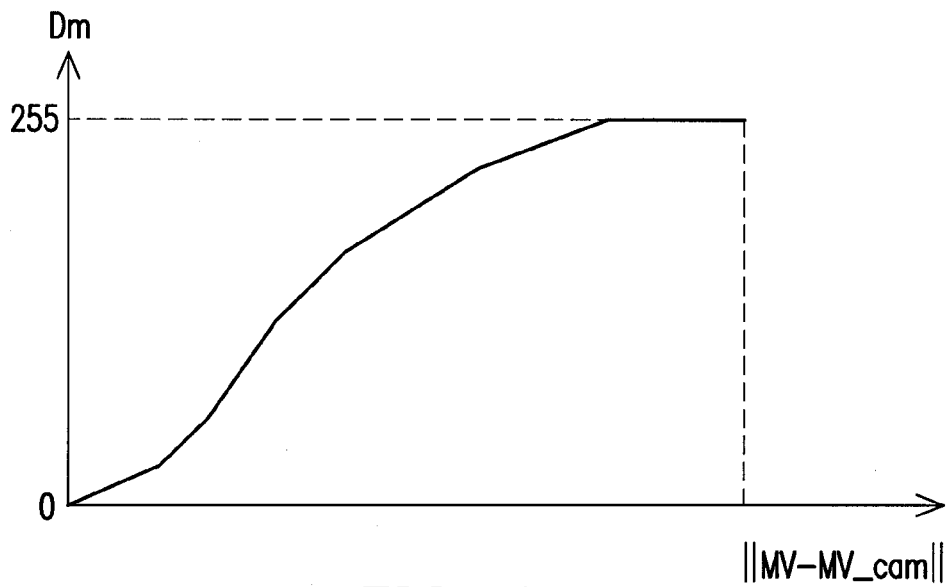
FIG. 4 is diagram illustrating a curve mapping relationship between motion differences and depth-from-motions according to an embodiment of the invention.

FIG. 4 is diagram illustrating a curve mapping relationship between the motion differences and the depth-from-motions according to an embodiment of the invention. In the step S310, a method for the depth calculation module 130 obtaining the depth-from-motions is, for example, to use the curve mapping relationship of FIG. 4 to generate the depth-from-motion of each of the blocks, though the invention is not limited thereto. In another embodiment, the depth-from-motions can also be generated by using a look-up table.

In FIG. 4, a horizontal axis represents the motion differences $\|MV-MV\_cam\|$, where MV represents the local motion vectors, MV_cam represents the global motion vector, and an absolute value sign on the difference there between emphasis that the motion difference is a magnitude of a vector difference. A vertical axis represents the depth-from-motions. In the present embodiment, the local motion vectors are calculated based on blocks, so that the greater the motion difference of one block is, the greater the depth-from-motion of the block is. Therefore, in the present embodiment, the motion vector calculation module 110 produces the correct depth-from-motions according to the vector differences of the local motion vectors and the global motion vector.

Figure 5:
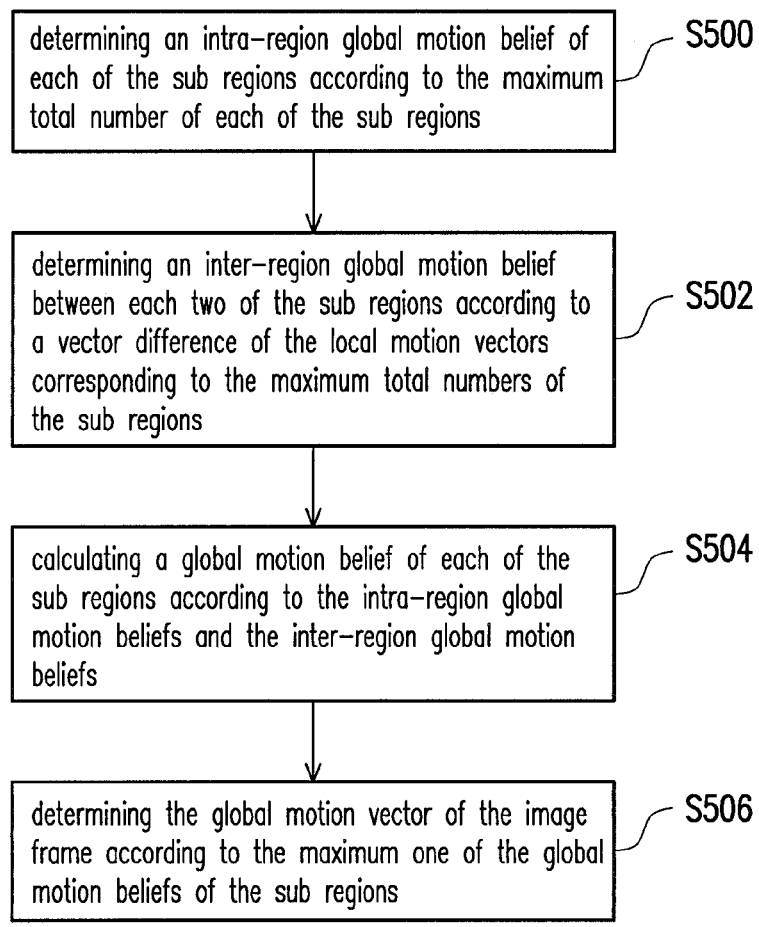
FIG. 5 is a flowchart illustrating a method of determining a global motion vector of an image frame according to a maximum total number of each of the sub regions and corresponding local motion vectors.
Figure 6:
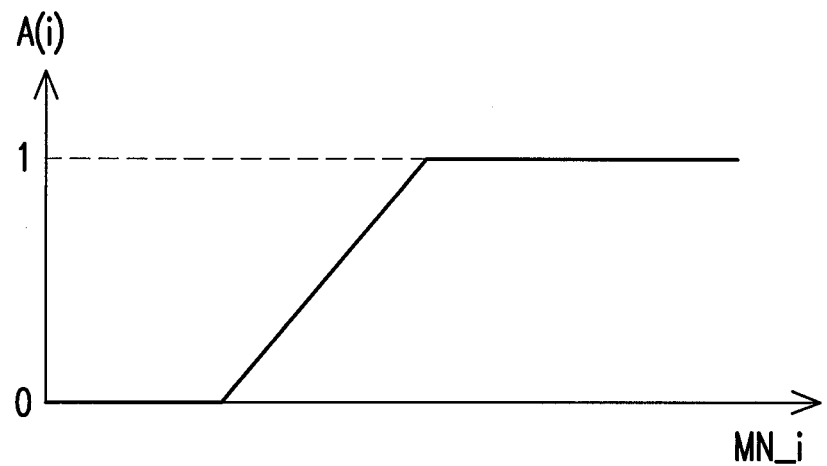
FIG. 6 is a diagram illustrating a curve mapping relationship between maximum total numbers and intra-region global motion beliefs according to an embodiment of the invention.
Figure 7:
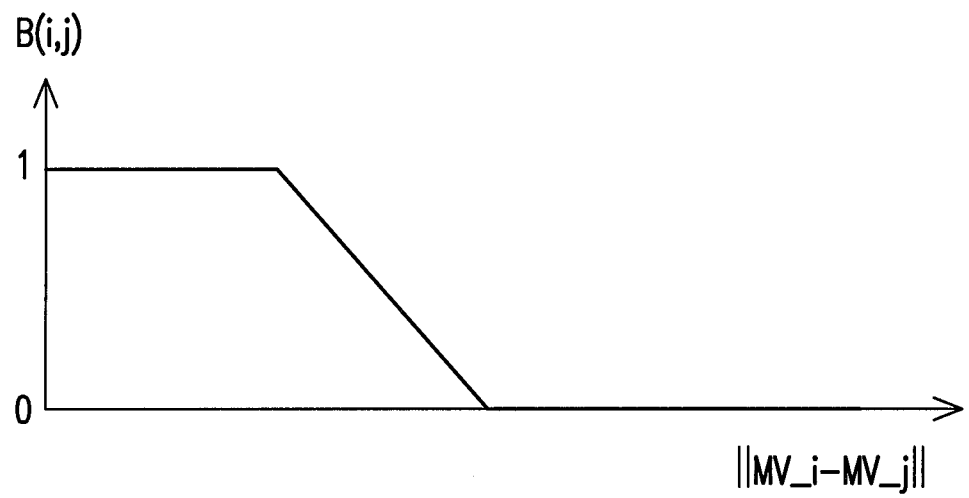
FIG. 7 is a diagram illustrating a curve mapping relationship between differences of local motion vectors corresponding to maximum total numbers and intra-region global motion beliefs according to an embodiment of the invention.

FIG. 5 is a flowchart illustrating a method of determining the global motion vector of the image frame according to the maximum total number of each of the sub regions and the corresponding local motion vectors according to an embodiment of the invention. FIG. 6 is a diagram illustrating a curve mapping relationship between the maximum total numbers and intra-region global motion beliefs according to an embodiment of the invention. FIG. 7 is a diagram illustrating a curve mapping relationship between differences of the local motion vectors corresponding to the maximum total numbers and intra-region global motion beliefs according to an embodiment of the invention.

Referring to FIG. 5 and FIG. 7, in step S500, the motion vector calculation module 110 determines an intra-region global motion belief of each of the sub regions according to the maximum total number of each of the sub regions, and a method thereof is, for example, to use the curve mapping relationship of FIG. 6 to generate the intra-region global motion belief. In FIG. 6, a horizontal axis and a vertical axis respectively represent the maximum total numbers MN_i and the intra-region global motion beliefs A(i), where i is an integer between 0 and 3, which are respectively the maximum total numbers of the sub regions R0-R3 and the intra-region global motion beliefs. For example, MN_0 and A(0) respectively represent the maximum total numbers of the sub region R0 and the intra-region global motion belief, and the others are deduced by analogy.

According to FIG. 6, it is known that when the maximum total number MN_i of each of the sub regions is greater than a specific threshold, the intra-region global motion belief thereof is increased as the total number MN_i increases until the maximum total number MN_i is greater than another specific threshold, the intra-region global motion belief thereof is equal to 1, where a higher intra-region global motion belief represents a higher credit.

Then, in step S502, the motion vector calculation module 110 determines an inter-region global motion belief between each two of the sub regions according to a vector difference of the local motion vectors corresponding to the maximum total numbers of the sub regions. In detail, in the step S502, the motion vector calculation module 110 first calculates vector differences of the local motion vectors corresponding to the maximum total numbers of the sub regions, and then determines the inter-region global motion beliefs between the sub regions according to the vector differences of the local motion vectors corresponding to the maximum total numbers.

The motion vector calculation module 110 can produce the inter-region global motion beliefs according to the curve mapping relationship of FIG. 7. In FIG. 7, a horizontal axis and a vertical axis respectively represent vector differences $\|MV\_i-MV\_j\|$ between the local motion vectors corresponding to the maximum total numbers and the inter-region global motion beliefs B(i,j), where i is an integer between 0 and 3, and j is an integer between 0 and 3, which are respectively the local motion vectors corresponding to the maximum total numbers of the sub regions and the inter-region global motion beliefs. For example, MV_0 and MV_1 respectively represent the local motion vectors of the maximum total numbers of the sub regions R0 and R1, and $\|MV\_0-MV\_1\|$ represents the vector difference there between, and vice versa. B(0,1) represents the inter-region global motion belief between the sub regions R0 and R1, and the others are deduced by analogy. In case that the peripheral display region R has four sub regions, there are six inter-region global motion beliefs B(i,j), i.e. the integer i and the integer j has six combinations (regardless of permutations).

According to FIG. 7, it is known that when the vector difference $\|MV\_i-MV\_j\|$ is smaller than a specific threshold, the inter-region global motion belief thereof is equal to 1. When the vector difference $\|MV\_i-MV\_j\|$ is greater than the specific threshold, the inter-region global motion belief is decreased as the vector difference $\|MV\_i-MV\_j\|$ increases until the $\|MV\_i-MV\_j\|$ is greater than another specific threshold, the inter-region global motion belief is decreased to 0, where a higher inter-region global motion belief represents a higher credit of the global motion information between the two sub regions.

Then, in step S504, the motion vector calculation module 110 calculates a global motion belief Belief(i) of each of the sub regions according to the intra-region global motion beliefs A(i) and the inter-region global motion beliefs B(i,j). The global motion beliefs Belief(i) are calculated according to following equations:

Belief(0)=A(0)+A(1)*B(0,1)+A(2)*B(0,2)+A(3)*B(0,3)
Belief(1)=A(0)*B(0,1)+A(1)+A(2)*B(1,2)+A(3)*B(1,3)
Belief(2)=A(0)*B(0,2)+A(1)*B(1,2)+A(2)+A(3)*B(2,3)
Belief(3)=A(0)*B(0,3)+A(1)*B(1,3)+A(2)*B(2,3)+A(3)

Where, Belief(0), Belief(1), Belief(2), Belief(3) respectively represent the global motion beliefs of the sub regions R0, R1, R2 and R3. Taking the global motion belief Belief(0) as an example, an item A(1)*B(0,1) represents a multiplication of the intra-region global motion belief A(1) of the sub region R1 and the inter-region global motion belief B(0,1) between the sub regions R0 and R1, and the others are deduced by analogy.

In other words, the global motion belief of one of the sub regions is calculated according to the intra-region global motion belief of the one of the sub regions, the inter-region global motion beliefs between the one of the sub regions and the other sub regions, and the intra-region global motion beliefs of the other sub regions. Taking the global motion belief Belief(0) as an example, it is calculated according to the intra-region global motion belief A(0) of the sub region R0, the inter-region global motion beliefs B(0,1), B(0,2) and B(0,3) between the sub region R0 and the other sub regions R1, R2 and R3, and the intra-region global motion beliefs A(1), A(2) and A(3) of the other sub regions R1, R2 and R3.

Then, in step S506, the motion vector calculation module 110 determines the global motion vector MV_cam of the image frame according to the maximum one of the global motion beliefs of the sub regions R0, R1, R2 and R3.

Therefore, after the global motion vector MV_cam is determined, the depth generation method of FIG. 3 is continued to execute the steps S308 and S310 to respectively calculate the motion differences $\|MV-MV\_cam\|$, so as to obtain the depth-from-motion Dm.

In summary, the depth generation method in the embodiments calculates the global motion vector of the image frame and the vector differences of the local motion vectors and the global motion vector, so as to generate a correct depth-from-motion of each block according to the motion differences. Moreover, since the global motion vector can be calculated only according to the local motion vectors of the peripheral display region while neglecting the local motion vectors of the central display region, influence caused by foreground object motion can be excluded, and the correct global motion vector can be obtained, and accordingly accuracy of the depth-from-motion can be enhanced.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents.

What is claimed is:

1. A depth generation method comprising:
obtaining a plurality of local motion vectors in an image frame by motion estimation;
obtaining a global motion vector of the image frame;
calculating motion differences between the local motion vectors and the global motion vector; and
obtaining a depth-from-motion of each of the blocks according to the motion differences,
wherein the depth generation method is adapted to a two-dimensional (2D) to three-dimensional (3D) image conversion device.

2. The depth generation method as claimed in claim 1, wherein the image frame comprises a black rim, a peripheral display region and a central display region, and the step of obtaining the global motion vector of the image frame comprises:
calculating the global motion vector according to a plurality of the local motion vectors of the peripheral display region.

3. The depth generation method as claimed in claim 2, wherein the central display region covers a center of the image frame.

4. The depth generation method as claimed in claim 2, wherein the peripheral display region is located between the black rim and the central display region.

5. The depth generation method as claimed in claim 2, wherein
the peripheral display region comprises a plurality of sub regions, and the step of obtaining the global motion vector of the image frame comprises:

calculating a statistic number distribution of the local motion vectors in each of the sub regions;

obtaining a local motion vector having a maximum total number in each of the sub regions according to the statistic number distribution of each of the sub regions; and determining the global motion vector of the image frame according to the maximum total number of each of the sub regions and the corresponding local motion vector.

6. The depth generation method as claimed in claim 5, wherein at least two of the sub regions are overlapped to each other.

7. The depth generation method as claimed in claim 5, wherein the step of determining the global motion vector of the image frame according to the maximum total number of each of the sub regions and the corresponding local motion vector comprises:

determining an intra-region global motion belief of each of the sub regions according to the maximum total number of each of the sub regions;

determining an inter-region global motion belief between each two of the sub regions according to the local motion vector corresponding to the maximum total number of each of the sub regions; and determining the global motion vector of the image frame according to the intra-region global motion beliefs and the inter-region global motion beliefs.

8. The depth generation method as claimed in claim 7, wherein the step of obtaining the global motion vector of the image frame comprises:

calculating a global motion belief of each of the sub regions according to the intra-region global motion beliefs and the inter-region global motion beliefs; and determining the global motion vector of the image frame according to a maximum one of the global motion beliefs of the sub regions.

9. The depth generation method as claimed in claim 8, wherein the global motion belief of one of the sub regions is calculated according to the intra-region global motion belief of the one of the sub regions, the inter-region global motion beliefs between the one of the sub regions and the other sub regions, and the intra-region global motion beliefs of the other sub regions.

10. The depth generation method as claimed in claim 7, wherein the step of determining the inter-region global motion belief between each two of the sub regions comprises:

calculating vector differences between the local motion vectors corresponding to the maximum total numbers of the sub regions; and determining the inter-region global motion belief between each two of the sub regions according to a corresponding one of the vector differences between the local motion vectors corresponding to the maximum total numbers.

11. A depth generation apparatus comprising:

a motion vector calculation module obtaining local motion vectors in an image frame by motion estimation, and obtaining a global motion vector of the image frame;

a difference calculation module calculating motion differences between the local motion vectors and the global motion vector; and a depth calculation module obtaining a depth-from-motion of each of the blocks according to the motion differences, wherein the depth generation apparatus is adapted to a two-dimensional (2D) to three-dimensional (3D) image conversion device.

12. The depth generation apparatus as claimed in claim 11, wherein the image frame comprises a black rim, a peripheral display region and a central display region, and the motion vector calculation module calculates the global motion vector according to a plurality of the local motion vectors of the peripheral display region.

13. The depth generation apparatus as claimed in claim 12, wherein the central display region covers a center of the image frame.

14. The depth generation apparatus as claimed in claim 12, wherein the peripheral display region is located between the black rim and the central display region.

15. The depth generation apparatus as claimed in claim 12, wherein the peripheral display region comprises a plurality of sub regions, and the motion vector calculation module executes following steps:

calculating a statistic number distribution of the local motion vectors in each of the sub regions, and obtaining a maximum total number of each of the sub regions, and obtaining a local motion vector having the maximum total number in each of the sub regions according to the statistic number distribution of each of the sub regions, and determining the global motion vector of the image frame according to the maximum total number of each of the sub regions and the corresponding local motion vector.

16. The depth generation apparatus as claimed in claim 15, wherein at least two of the sub regions are overlapped to each other.

17. The depth generation apparatus as claimed in claim 15, wherein the motion vector calculation module determines an intra-region global motion belief of each of the sub regions according to the maximum total number of each of the sub regions, determines an inter-region global motion belief between each two of the sub regions according to the local motion vector corresponding to the maximum total number of each of the sub regions, and determines the global motion vector of the image frame according to the intra-region global motion beliefs and the inter-region global motion beliefs.

18. The depth generation apparatus as claimed in claim 17, wherein the motion vector calculation module calculates a global motion belief of each of the sub regions according to the intra-region global motion beliefs and the inter-region global motion beliefs, and determines the global motion vector of the image frame according to a maximum one of the global motion beliefs of the sub regions.

19. The depth generation apparatus as claimed in claim 18, wherein the global motion belief of one of the sub regions is calculated according to the intra-region global motion belief of the one of the sub regions, the inter-region global motion beliefs between the one of the sub regions and the other sub regions, and the intra-region global motion beliefs of the other sub regions.

20. The depth generation apparatus as claimed in claim 17, wherein the motion vector calculation module calculates vector differences between the local motion vectors corresponding to the maximum total numbers of the sub regions, and determines the inter-region global motion belief between each two of the sub regions according to a corresponding one of the vector differences between the local motion vectors corresponding to the maximum total numbers.

* * * * *